(12) United States Patent
Saito et al.

(10) Patent No.: US 7,826,936 B2
(45) Date of Patent: Nov. 2, 2010

(54) VEHICLE STATIONARY/MOVING DETERMINATION APPARATUS

(75) Inventors: Hideki Saito, Anjo (JP); Akihiro Taguchi, Oobu (JP); Nobuya Watabe, Nagoya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 371 days.

(21) Appl. No.: 11/905,237

(22) Filed: Sep. 28, 2007

(65) Prior Publication Data

US 2008/0082220 A1    Apr. 3, 2008

(30) Foreign Application Priority Data

Sep. 29, 2006 (JP) .............................. 2006-266755

(51) Int. Cl.
*G05D 1/00* (2006.01)
(52) U.S. Cl. ........................... 701/1; 73/146.5; 340/444
(58) Field of Classification Search ................ 73/146.5; 701/1; 340/442, 444
See application file for complete search history.

(56) References Cited

U.S. PATENT DOCUMENTS 6,591,671 B2 *   7/2003   Brown ........................ 73/146.5
6,693,522 B2 *   2/2004   Tang et al. ................... 340/445

FOREIGN PATENT DOCUMENTS

| DE | 101 35 936 | 2/2003 |
|---|---|---|
| DE | 10 2004 006 977 | 9/2005 |
| JP | 2003-248890 | 9/2003 |
| JP | 2006-039762 | 2/2006 |

OTHER PUBLICATIONS

German Office Action dated Dec. 11, 2009, issued in corresponding German Application No. 10 2007 044 925.0-53, with English translation.

* cited by examiner

*Primary Examiner*—Mark Hellner
(74) *Attorney, Agent, or Firm*—Nixon & Vanderhye PC

(57) ABSTRACT

The vehicle stationary/moving determination apparatus includes an antenna mounted on a vehicle body of a vehicle; and a determination device determining whether or not the vehicle is moving or stationary on the basis of a reception intensity of a radio signal transmitted from a radio transmitter device mounted on the vehicle at a portion other than the vehicle body and received by the antenna.

2 Claims, 5 Drawing Sheets

VEHICLE STATIONARY/MOVING DETERMINATION APPARATUS

CROSS-REFERENCE TO RELATED APPLICATION

This application is related to Japanese Patent Application No. 2006-266755 filed on Sep. 29, 2006, the contents of which are hereby incorporated by reference.

BACKGROUND OF THE INVENTION

1. Field of the Invention

The present invention relates to a stationary/moving determination apparatus for determining whether a vehicle on which this apparatus is mounted is stationary or moving.

2. Description of Related Art

There are known various techniques for determining whether a vehicle is moving or not. These techniques include the one that uses a vehicle speed pulse signal outputted from an engine ECU (Electronic Control Unit), a meter panel, or ABS (Anti-lock Brake System). It is also known to determine whether a vehicle is moving or not on the basis of vehicle acceleration data received from a sensor mounted on a wheel of the vehicle.

An object of the present invention is to provide a new apparatus capable of determining whether a vehicle on which this apparatus is mounted is moving or stationary without using a vehicle speed pulse signal or vehicle acceleration data.

SUMMARY OF THE INVENTION

The present invention provides a vehicle stationary/moving determination apparatus comprising:

an antenna mounted on a vehicle body of a vehicle; and a determination device determining whether or not the vehicle is moving or stationary on the basis of a reception intensity of a radio signal transmitted from a radio transmitter device mounted on the vehicle at a portion other than the vehicle body and received by the antenna.

According to the present invention, it is possible to determine whether a vehicle is stationary or moving without a vehicle speed sensor.

The radio transmitter device may be mounted on a wheel of the vehicle.

The determination device may determine a vehicle speed of the vehicle on the basis of a varying aspect of the reception intensity.

The determination device may store therein intensity/angle corresponding relationship data representing a relationship between the reception intensity and an angle position of the wheel, and may be configured to determine the vehicle speed corresponding to a rotation angular width of the wheel (i.e., an arc of wheel rotation) during a predetermined reference period by collating an aspect of temporal variation of the reception intensity during the reference period with the intensity/angle corresponding relationship data.

Other advantages and features of the invention will become apparent from the following description including the drawings and claims.

PREFERRED EMBODIMENTS OF THE INVENTION

Figure 1:
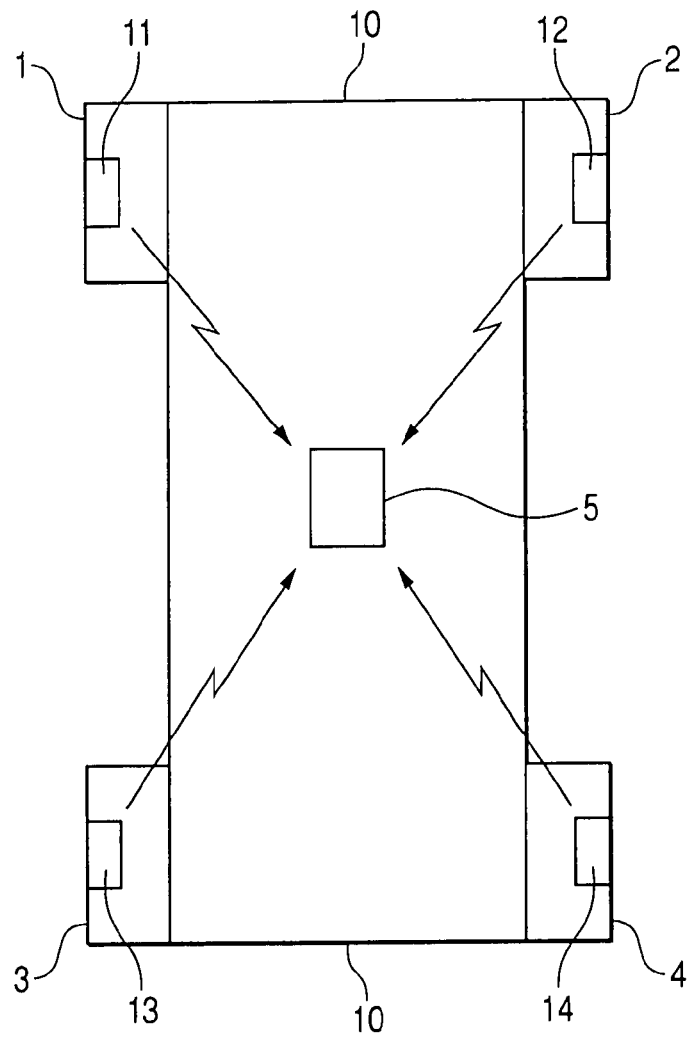
FIG. 1 is a diagram showing a schematic view of a vehicle on which a stationary/moving determination apparatus according to an embodiment of the invention is mounted.

FIG. 1 is a diagram showing a schematic view of a vehicle on which a stationary/moving determination apparatus according to an embodiment of the invention is mounted. The vehicle is also provided with a tire pressure detecting system. First, explanation is made as to the tire pressure detection system. This tire pressure detecting system includes a left-front radio transmitter device 11 mounted on a left-front wheel 1 of the vehicle, a right-front radio transmitter device 12 mounted on a left-front wheel 2, a left-rear radio transmitter device 13 mounted on a left-rear wheel 3, a right-rear radio transmitter device 14 mounted on a right-rear wheel 4, and a radio receiver device 5 mounted on a vehicle body 10 exclusive of the wheels 1 to 4.

Each of the radio transmitter devices 11 to 14 is fixed to a wheel disk of corresponding one of the wheels 1 to 4. More specifically, each of them is fixed to the wheel disk at a portion other than a rotation center portion, for example, a wheel rim portion.

Each of the radio transmitter devices 11 to 14 is configured to continuously search sensor data including a tire pressure and a tire temperature of corresponding one of the wheels 1 to 4, as well as a battery voltage and status thereof, and to periodically transmit the data being added with its own ID code to the radio receiver device 5 in the form of a radio signal.

Figure 2:
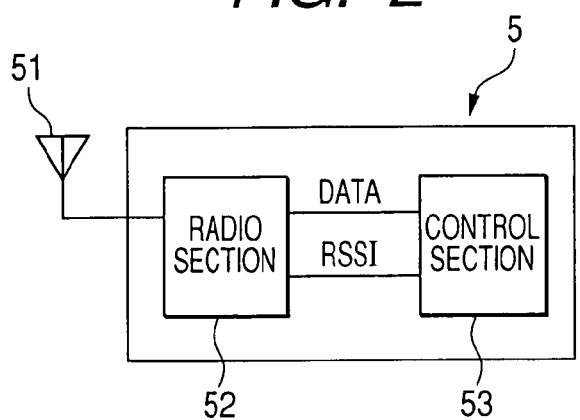
FIG. 2 is a diagram showing a hardware structure of a radio receiver device used for a tire pressure detecting system mounted on the vehicle and for the stationary/moving determination apparatus.

FIG. 2 shows a hardware structure of the radio receiver device 5. As shown in this figure, the radio receiver device 5 includes an antenna 51, a radio section 52, and a control section 53.

The antenna 51, which is located at such a position (a center portion of the vehicle body 10, for example) that it can receive the radio signal transmitted from the radio transmitter devices 11 to 14, forwards the received radio signal to the radio section 52 as an electrical signal.

The radio section 52 subjects the electrical signal to an amplification process, a frequency conversion process, and a demodulation process, etc., and outputs data as results of these processes to the control section 53. The radio section 52 also outputs an RSSI (Receive Signal Strength Indicator) voltage having a value increasing with the increase of the electrical signal received from the antenna 51 to the control section 53. This RSSI voltage is produced by a not shown RSSI circuit included in the radio section 52.

The control section 53, which is constituted by a microcomputer including a CPU, a RAM, a ROM, a flash memory, and an I/O, is communicably connected to various devices mounted on the vehicle. The CPU, which operates in accordance with programs stored in the ROM, and the data and RSSI voltage received from the radio section 52, reads data from the RAM, ROM, writes data into the flash memory, and controls not shown various devices mounted on the vehicle.

For example, each time the control section 53 receives data from the radio section 52, if an ID code included in this data matches one of ID codes respectively assigned to the radio transmitter device 11 to 14 and prestored in the ROM or flash memory, the control section 53 determines whether or not the pressure, temperature, status, etc. indicated by this data are within their allowable ranges. If a result of the determination is negative, the control section 53 lights an alarm lamp in a vehicle cabin to inform a vehicle driver and passengers of occurrence of abnormality in at least one of the wheels of the vehicle.

The control section 53 also periodically performs a stationary/moving determination procedure. In this stationary/moving determination procedure, the control section 53 determines whether the vehicle is moving or stationary on the basis of the RSSI voltage received from the radio section 53, and detects a speed of the vehicle when the vehicle is determined to be moving.

Figure 3:
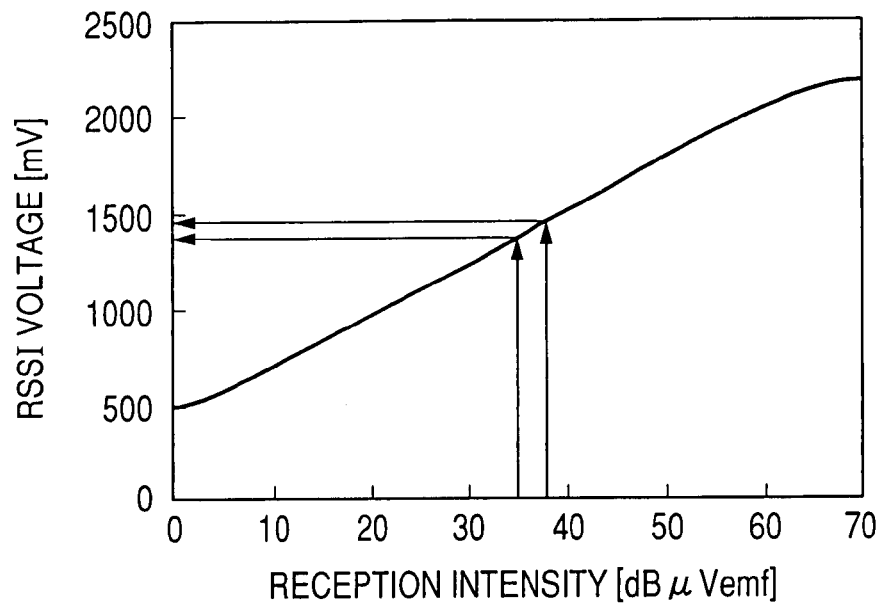
FIG. 3 is a diagram showing a relationship between a reception intensity of a radio signal received by an antenna of the radio receiver device and an RSSI voltage produced by the radio receiver device.

In the ROM or flash memory of the control section 53, there is stored data representing a relationship between reception intensity of the radio signal received by the antenna 51 and the value of the RSSI voltage which the radio section 52 should produce from this radio signal. This data used for performing the stationary/moving determination procedure is referred to as "voltage/intensity corresponding relationship data" hereinafter. FIG. 3 shows one example of the voltage/intensity corresponding relationship data in which the voltage (mV) and the reception intensity (dBμVemf) are in a roughly linear relationship. The voltage/intensity corresponding relationship data may be prepared through actual measurement at the time of mounting the tire pressure detecting system on the vehicle.

In the ROM or the flash memory of the control section 53, there is also stored data representing relationship between the reception intensity of the radio signal received by the antenna 51 and a wheel angle position for each of the four wheels 1 to 4 to perform the stationary/moving determination procedure. This data is referred to as "intensity/angle corresponding relationship data" hereinafter.

Figure 4:
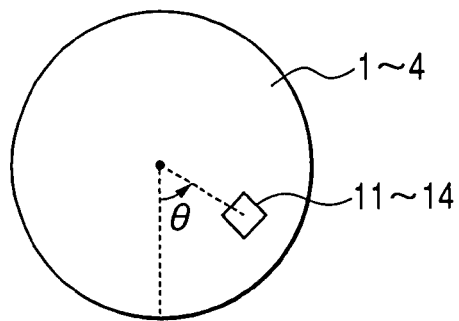
FIG. 4 is a diagram showing a definition of a wheel angle position.
Figure 5:
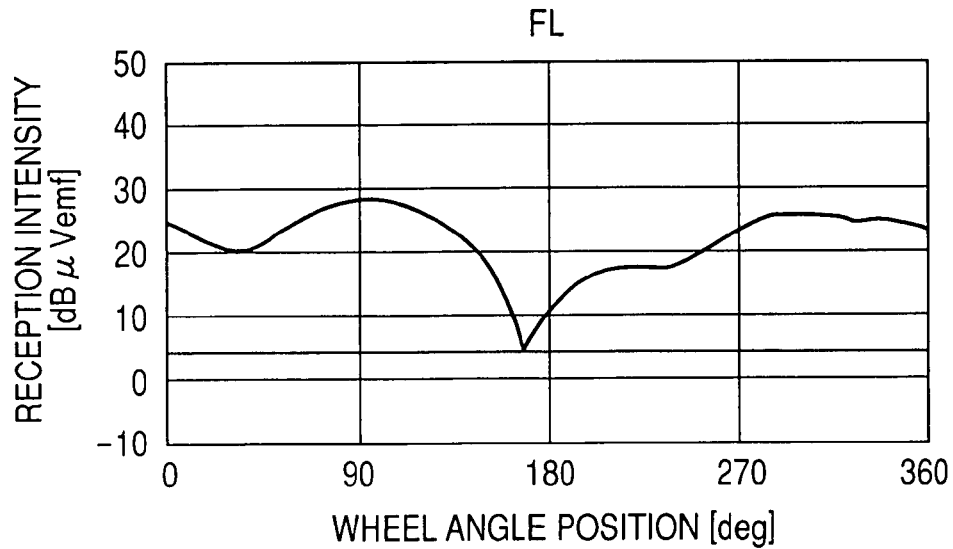
FIG. 5 is a diagram showing a relationship between the wheel angle position and the reception intensity of the radio signal received by the antenna of the radio receiver device for a left-front wheel of the vehicle.
Figure 6:
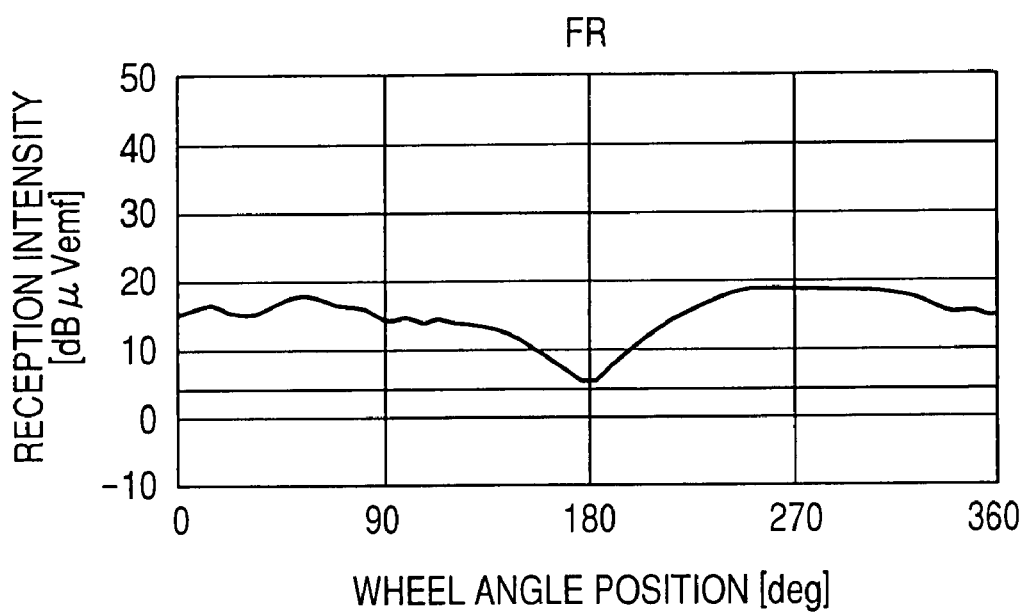
FIG. 6 is a diagram showing a relationship between the wheel angle position and the reception intensity of the radio signal received by the antenna of the radio receiver device for a right-front wheel of the vehicle.
Figure 7:
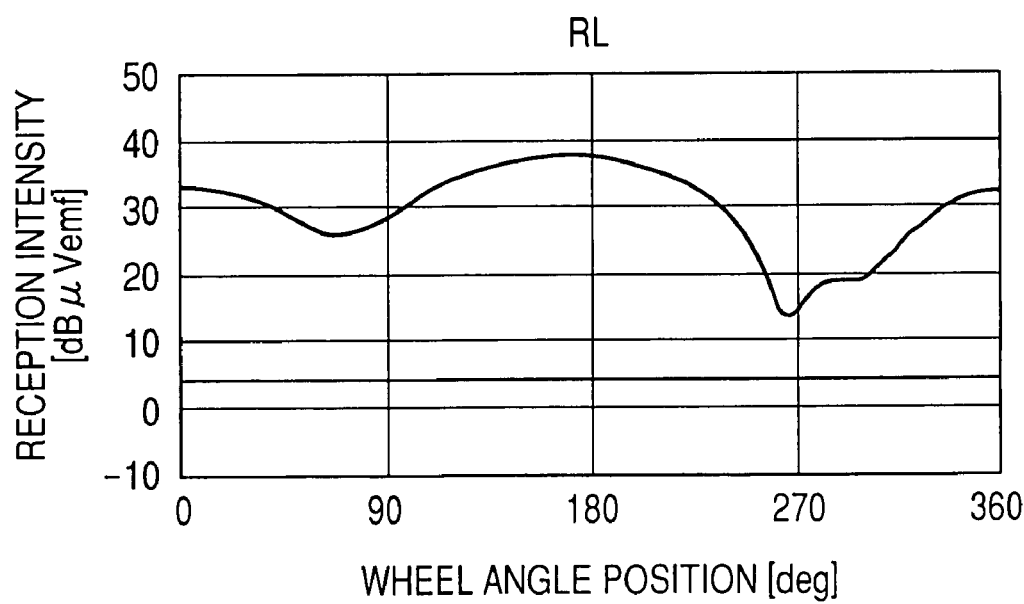
FIG. 7 is a diagram showing a relationship between the wheel angle position and the reception intensity of the radio signal received by the antenna of the radio receiver device for a left-rear wheel of the vehicle.
Figure 8:
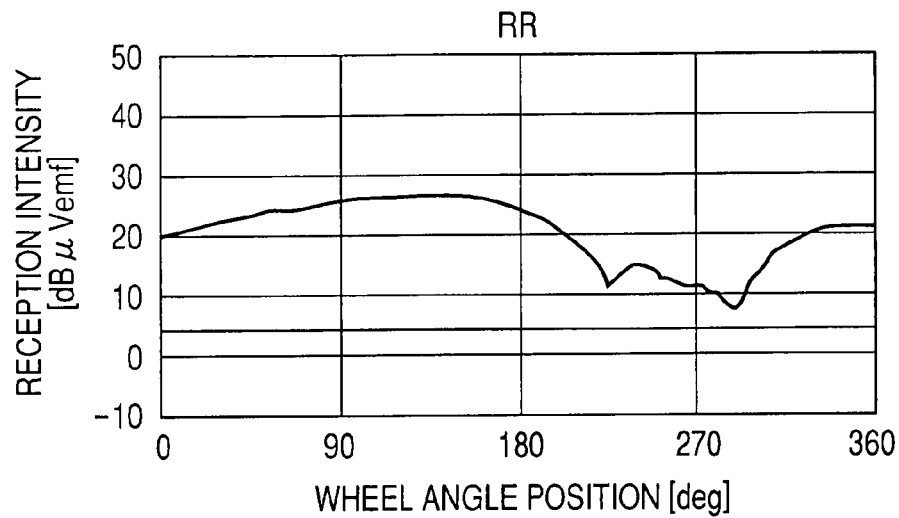
FIG. 8 is a diagram showing a relationship between the wheel angle position and the reception intensity of the radio signal received by the antenna of the radio receiver device for a right-rear wheel of the vehicle.

As shown in FIG. 4, the wheel angle position is defined by an angle theta between a direction from the rotation center of the wheel (wheels 1 to 4) to vertical down and a direction from the rotation center of the wheel to the radio transmitter device (radio transmitter devices 11 to 14). The angle theta positively increases in a range from 0 degree to 360 degrees when the vehicle moves forward.

FIG. 5, FIG. 6, FIG. 7, and FIG. 8 show the intensity/angle corresponding relationship data for the left-front wheel 1, right-front wheel 2, left-rear wheel 3, and right-rear wheel 4, respectively. The intensity/angle corresponding relationship data may be plotted at 1-degree intervals from 0-degree position to 359-degree position (360 plots), or may be plotted at 5-degree intervals from 0-degree position to 355-degree position (72 plots). The intensity/angle corresponding relationship data may be prepared through actual measurement at the time of mounting the tire pressure detecting system on the vehicle.

The control section 53 periodically (every 1 ms, for example) writes the RSSI voltage received from the radio section 52 into the RAM for performing the stationary/moving determination procedure. The RSSI voltage may be written in such a form that a voltage ranging from 0V to 5V is linearly represented by 10-bit signal. In this case, 1LSB is equivalent to 4.9 mV. The RSSI voltages which were written before a predetermined time ago (0.1 seconds ago, for example) may be erased from the ROM.

Figure 9:
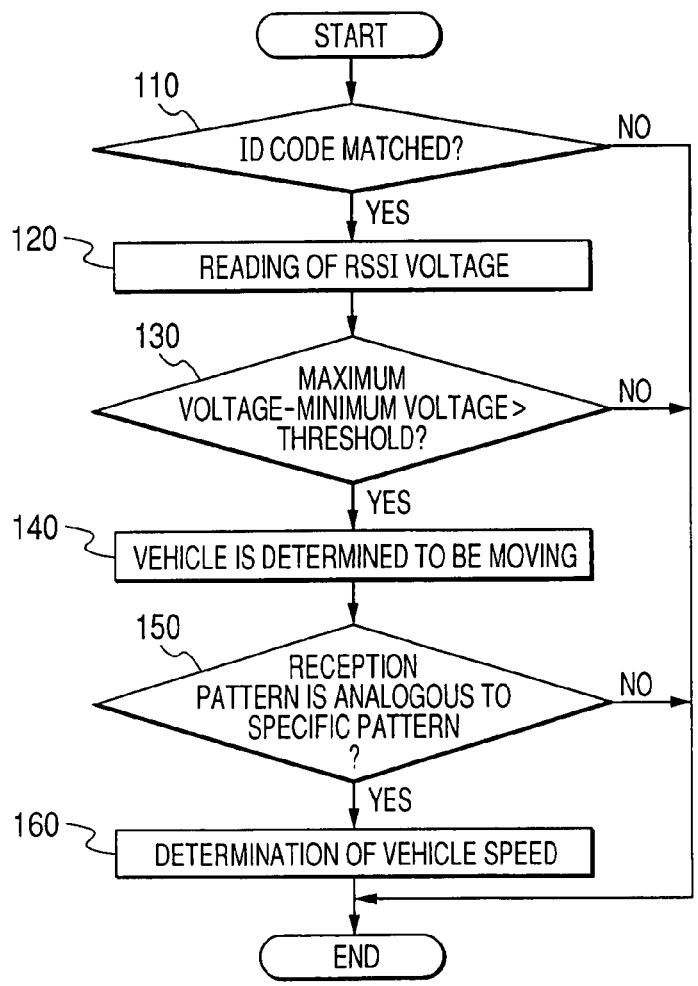
FIG. 9 is a flowchart showing a procedure performed by a control section of the radio receiver device for determining whether the vehicle is moving of stationary.

FIG. 9 shows the stationary/moving determination procedure which the control section 53 performs simultaneously with the above described various processes each time it completes a reception process of a signal sent from the outside.

This procedure begins by determining, at step S110, whether a signal last received is one from one of the radio transmitter devices 11 to 14 respectively mounted on the wheels 1 to 4 by comparing an ID code included in this received signal matches with one of the ID codes respectively assigned to the radio transmitter devices 11 to 14. If the check result at step S110 is affirmative, the procedure proceeds to step S120, and otherwise, the procedure is terminated.

At step S120, the RSSI voltages that have been written into the RAM by the control section 53 during a reception period as a reference period ranging from the start of reception of this signal to the end of reception of this signal are read out from the RAM.

At step S130, a maximum voltage and a minimum voltage are extracted from the read RSSI voltages, and it is determined whether or not a difference between the maximum voltage and the minimum voltage is larger than a predetermined threshold value. Here, the reference threshold value is decimal 3 (0000000011 in 10-bit binary code).

Assume a case where the control section 53 starts receiving the radio signal transmitted from the radio transmitter device 13 mounted on the left-rear wheel 3 at a timing at which the left-rear wheel 3 came to an angle position of 180 degrees, and stops receiving the radio signal after 14.2 ms have passed from this timing when the left-rear wheel 3 is in an angle position of 215.5 degrees by making a further rotation of 35.5 degrees. As indicated in the graph showing the intensity/angle corresponding relationship data for the left-rear wheel 3, as the left-rear wheel 3 rotates from the angle position of 180 degrees to the angle position of 215.5 degrees, the reception intensity is lowered from 38 dBμVemf to 35 dBμVemf. According to FIG. 3, this lowering of the reception intensity is equivalent to a lowering of the RSSI voltage from 1465 mV to 1380 mV. In this embodiment, since 1465 mV and 1380 mV are recorded as 299 and 282, respectively in decimal notation the difference therebetween is 17 in decimal notation. Accordingly, in this case, the determination result at step S130 becomes affirmative.

In this embodiment, variation of reception intensity of one radio signal transmitted from the radio transmitter device 13 is compared with a certain threshold at step S130 to make the stationary/moving determination, however, variation of reception intensities of a plurality of radio signals transmitted from the radio transmitter device 13, which have been subjected to a statistical processing, may be compared with a certain threshold to make the stationary/moving determination.

If the determination result at step S130 is affirmative, it is determined at step S140 that the vehicle is moving. If the determination result at step S130 is negative, the procedure of FIG. 9 is terminated.

Figure 10:
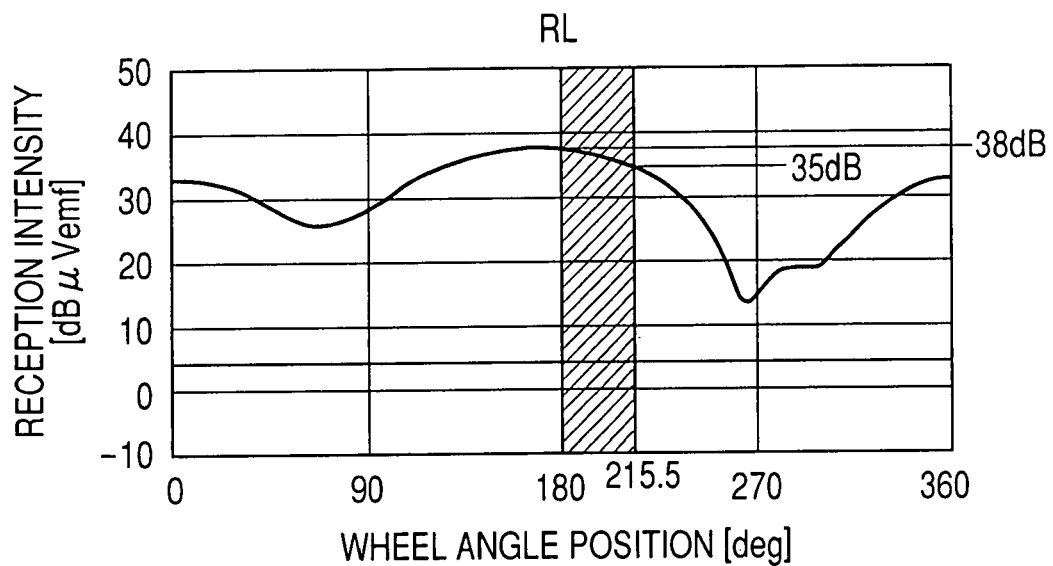
FIG. 10 is a diagram for explaining a procedure for determining whether variation of the reception intensity of the radio signal exceeds a predetermined value during a reception period of the radio signal.

Subsequently, at step S150, a varying aspect of the read RSSI voltages of during the reception period is compared to the curve of the intensity/angle corresponding relationship data. To perform this comparison, the reception intensity in the graph of FIG. 10 is converted into the RSSI voltage in accordance with the voltage/intensity corresponding relationship data shown in FIG. 3. As a result, there is obtained data representing a relationship between the RSSI voltage and the angle position of the wheel. This relationship data is referred to as "specific pattern" hereinafter. After that, it is determined whether or not this specific pattern includes an angle range which is analogous to a temporal variation pattern of the actually produced RSSI voltages (referred to as "reception pattern" hereinafter) by collating them with each other.

Here, it is assumed that an angular range included in the specific pattern is analogous to the reception pattern when the following conditions (1) to (3) are satisfied.

(1) The voltages at the beginnings of the angular range and the reception pattern are substantially the same.

(2) The voltages at the ends of the angular range and the reception pattern are substantially the same.

(3) The maximum voltages of the angular range and the reception pattern are substantially the same.

(4) The minimum voltages of the angular range and the reception pattern are substantially the same.

For example, when the variation of the RSSI voltages during the reception period is 17 in decimal notation, such a reception pattern that (1) the voltage at its beginning is 1445 mV, (2) the voltage at is end is 1380 mV, (3) its maximum voltage is 1465 mV, and (4) its minimum voltage is 1380 mV, matches only an angular range from 180 degrees to 215.5 degrees of the specific pattern of the left-rear radio transmitter device 13.

If it is determined at step S150 that the specific pattern includes an angular range which is analogous to the reception pattern, the procedure proceeds to step S160, and otherwise, this procedure is terminated.

Figure 11:
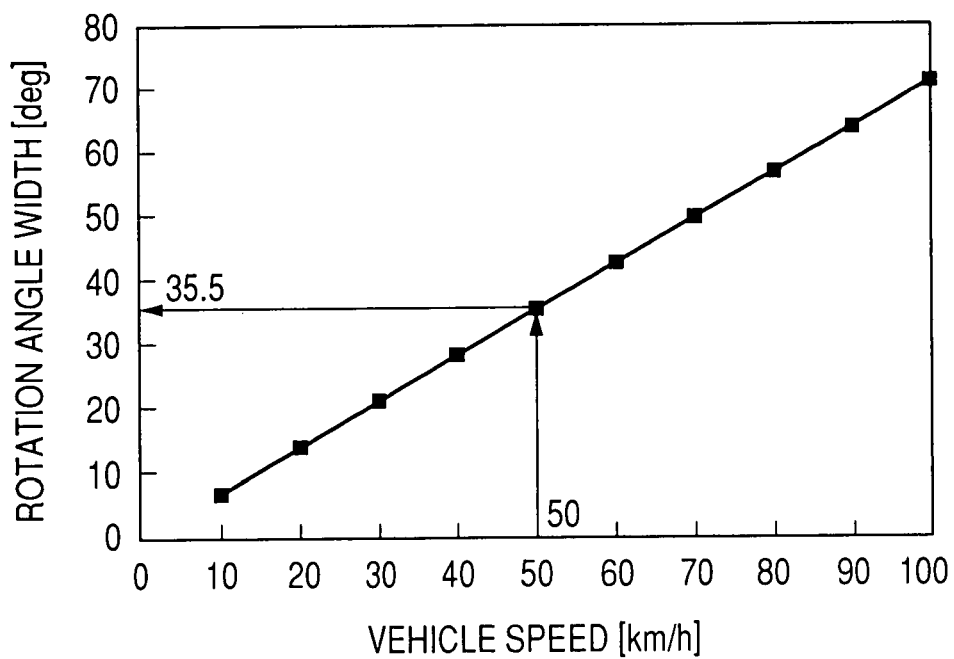
FIG. 11 is a diagram showing a relationship between a rotation angle width of the wheel and the vehicle speed.

At step S160, a speed of the vehicle is determined on the basis of the angle range of the specific pattern, which is determined to be analogous to the reception pattern in terms of intensity change. In a case where a circumference of the tire of the vehicle is 2 m, and a transmission duration time of the radio signal is set at 14.2 ms, the relationship between the vehicle speed and a rotation angle width is as shown in FIG. 11. The control section 53 determines the vehicle speed on the basis of the actual angular rotational arc width while referring to data representing the theoretical relationship between the vehicle speed and the angular rotational are width which is prestored in the ROM or flash memory. In this case, the angular rotational angle arc width of 35.5 degrees corresponds to the vehicle speed of 50 km/h. After completion of step S160, the procedure of FIG. 9 is terminated.

As explained above, this embodiment is configured to determine that the vehicle is moving if variation of the reception intensity of the radio signal is larger than a reference variation.

The radio transmitter devices 11 to 14 each serving as a transmission source of the radio signal used for the detection of the vehicle movement are respectively mounted on the wheels 1 to 4 of the vehicle. Since the distance between each radio transmitter device and the radio receiver device is short, and accordingly the radio signal received by the radio receiver device is hardly affected by other objects, the radio receiver device can accurately determine whether the vehicle is moving or not and also accurately determine the vehicle speed.

Incidentally, in a case where a plurality of angle ranges in the specific pattern are determined to be analogous to the reception pattern at step S150, one of them may be selected by performing a further fine analogous determination process (for example, a collation process using a least square method), or in this case, the procedure of FIG. 9 may be terminated without determining the vehicle speed.

To determine the vehicle speed with a higher accuracy, there may be used an average value of a plurality of determination results of the vehicle speed obtained by performing the vehicle speed determination process on a plurality of different radio signals.

When the vehicle is determined to be moving, data indicative of this determination result may be recorded in the flash memory together with the vehicle speed at the time.

This data may be also sent to microcomputer-based other device mounted on the vehicle through an in-vehicle LAN.

This other device may be configured to determine that a signal cable transmitting a vehicle speed pulse signal is broken if the vehicle speed pulse signal remains at the same level when this received data indicates that the vehicle is moving, and to inform the vehicle driver of this signal cable breakage. Incidentally, in a case where the control section 53 has a function of detecting the vehicle speed pulse signal, the control section 53 may inform the vehicle driver of the signal cable breakage.

Furthermore, this other device may be configured to determine that the vehicle is being towed by a thief if this received data indicates that the vehicle is moving when an ignition switch or main switch of the vehicle is off, and to record this determination result in a non-volatile memory. In a case where the control section 53 has a function of detecting an on/off state of the ignition switch, the control section 53 may make such a determination and record it.

Other Embodiments

It is a matter of course that various modifications can be made to the above described embodiment.

For example, the number of the antennas 51 is not limited to one. The antennas 51 may be installed at four positions respectively near the four wheels.

The above described embodiment may be so configured as to remeasure the intensity/angle corresponding relationship data each time a tire change is done in order to revise the intensity/angle corresponding relationship data depending on a newly fitted tire.

Although the control section 53 determines the relationship between the angular position of the wheel and the RSSI voltage by use of the intensity/angle corresponding relationship data and the voltage/intensity corresponding relationship data in the above described embodiment, the control section 53 may be so configured as to determine the angular rotational arc width of the wheel during the reception period on the basis of the actually produced RSSI voltages while referring to prerecorded data representing the relationship between the angular position of the wheel and the RSSI voltage.

The radio transmitter devices 11 to 14 may be respectively fixed to tire portions of the wheel 1 to 4.

The radio transmitter devices 11 to 14 may be so configured as to transmit the radio signal in response to a transmission request signal transmitted from the radio receiver device 5. In this case, the control section 53 may be configured to control the radio section 52 such that the transmission request signal is emitted from the antennas 51 as needed.

The signal used for determining whether the vehicle is moving or stationary and determining the vehicle speed is not limited to the radio signal transmitted from the radio transmitter devices 11 to 14 mounted on the wheels 1 to 4. For example, it may be a GPS signal transmitted from a GPS satellite, or may be a broadcast signal emitted from a TV antenna, that is because, it is possible to determine whether the vehicle is moving or not by detecting whether an intensity of a radio signal transmitted from a radio transmitter device located at a position other than a vehicle body and received by an antenna mounted on the vehicle body exceeds a predetermined value due to relative movement of the radio transmitter device to the vehicle body.

Although the various functions of the controller section 53 are implemented by executing programs in the above described embodiment, they may be implemented by hardware such as FPGA (Field Programmable Gate Arrays).

The above explained preferred embodiments are exemplary of the invention of the present application which is described solely by the claims appended below. It should be understood that modifications of the preferred embodiments may be made as would occur to one of skill in the art.

What is claimed is:

1. A vehicle stationary/moving determination apparatus comprising:
   at least one antenna mounted on a vehicle body; and
   a determination device configured to determine whether or not said vehicle body is moving or stationary based on reception intensity of a radio signal transmitted from a radio transmitter device mounted on a wheel of said vehicle at a portion other than said vehicle body and received by said at least one antenna,
   wherein said determination device determines vehicle speed based on a varying aspect of said reception intensity, and
   wherein said determination device has access to stored intensity/angle corresponding relationship data representing a relationship between said reception intensity and an angular position of said wheel, and is configured to determine said vehicle speed corresponding to an angular rotational arc width of said wheel during a predetermined reference time period by collating an aspect of temporal variation of said reception intensity during said reference period with said intensity/angle corresponding relationship data.

2. A machine-implemented method for determining whether a wheeled vehicle is stationary or moving, said method comprising:
   providing an antenna mounted on a vehicle body;
   using a digital signal processor configured to determine whether or not said vehicle is moving or stationary based on reception intensity of a radio signal transmitted from a radio transmitter device mounted on a wheel of said vehicle and received by said antenna,
   wherein said vehicle speed is determined based on a varying aspect of said reception intensity, and
   wherein stored intensity/angle corresponding relationship data representing a relationship between said reception intensity and an angular position of said wheel is used to determine said vehicle speed corresponding to an angular rotational arc width of said wheel during a predetermined reference time period by collating an aspect of temporal variation of said reception intensity during said reference period with said intensity/angle correspond relationship data.

* * * * *